(12) United States Patent
Reeder et al.

(10) Patent No.: US 12,025,485 B1
(45) Date of Patent: Jul. 2, 2024

(54) FISHING TOURNAMENT RECORDING AND VERIFYING SYSTEMS AND METHODS

(71) Applicant: Gillteq LLC, Shreveport, LA (US)

(72) Inventors: James Lon Reeder, Shreveport, LA (US); Jon Jeffcoat, Bossier City, LA (US); Trea Miller, Stonewall, LA (US)

(73) Assignee: Gillteq LLC, Shreveport, LA (US)

( * ) Notice: Subject to any disclaimer, the term of this patent is extended or adjusted under 35 U.S.C. 154(b) by 381 days.

(21) Appl. No.: 17/392,887

(22) Filed: Aug. 3, 2021

Related U.S. Application Data

(60) Provisional application No. 63/060,895, filed on Aug. 4, 2020.

(51) Int. Cl.
| | |
|---|---|
| *G01G 23/42* | (2006.01) |
| *G01G 17/00* | (2006.01) |
| *G01G 23/37* | (2006.01) |
| *H04N 7/18* | (2006.01) |

(52) U.S. Cl.
CPC ............. *G01G 23/42* (2013.01); *G01G 17/00* (2013.01); *G01G 23/3728* (2013.01); *H04N 7/183* (2013.01)

(58) Field of Classification Search
CPC ...... G01G 17/00; G01G 19/415; G01G 23/42; G01G 23/3728; A01K 99/00; H04N 7/183
See application file for complete search history.

(56) References Cited

U.S. PATENT DOCUMENTS

| | | | | |
|---|---|---|---|---|
| 4,753,031 A | * | 6/1988 | Owen .................... | A01K 97/00 206/315.11 |
| 4,839,675 A | * | 6/1989 | Owen .................... | A01K 97/00 206/315.11 |
| 6,222,449 B1 | * | 4/2001 | Twining ................. | A01K 97/00 340/5.1 |
| 7,173,197 B1 | * | 2/2007 | Kasperek ............... | A01K 97/00 177/148 |

(Continued)

*Primary Examiner* — Randy W Gibson
(74) *Attorney, Agent, or Firm* — R. Keith Harrison

(57) ABSTRACT

Fishing tournament recording and verifying systems suitable for ensuring honesty, accuracy and integrity in reporting and recording sizes of fish caught in a fishing tournament may include at least one scale configured to obtain at least one measured weight of a fish. At least one head unit may communicably interface with the at least one scale. The at least one head unit may be configured to capture at least one image of the fish and pair the at least one image of the fish with the at least one measured weight. At least one external database may communicably interface with the at least one head unit. The at least one external database may be configured to receive weight and image data corresponding to the at least one measured weight paired with the at least one image of the fish. At least one personal electronic device may communicably interface with the at least one external database. The at least one personal electronic device may be configured to receive the weight and image data from the at least one external database. A mobile app may be provided on the at least one personal electronic device. The mobile app may be configured to present the at least one measured weight paired with the at least one image of the fish on the (Continued)

personal electronic device. Fishing tournament recording and verifying methods are also disclosed.

18 Claims, 8 Drawing Sheets

(56) References Cited

U.S. PATENT DOCUMENTS

| | | | | |
|---|---|---|---|---|
| 8,921,716 | B2* | 12/2014 | Saulters | G01G 19/60 |
| | | | | 177/148 |
| 9,476,758 | B2* | 10/2016 | Jones | G01G 23/3735 |
| 10,021,859 | B1* | 7/2018 | Miller | A01K 99/00 |
| 2015/0055827 | A1* | 2/2015 | Bailey | G06F 3/014 |
| | | | | 382/103 |
| 2015/0316409 | A1* | 11/2015 | Castaneda | A01K 91/06 |
| | | | | 177/4 |

* cited by examiner

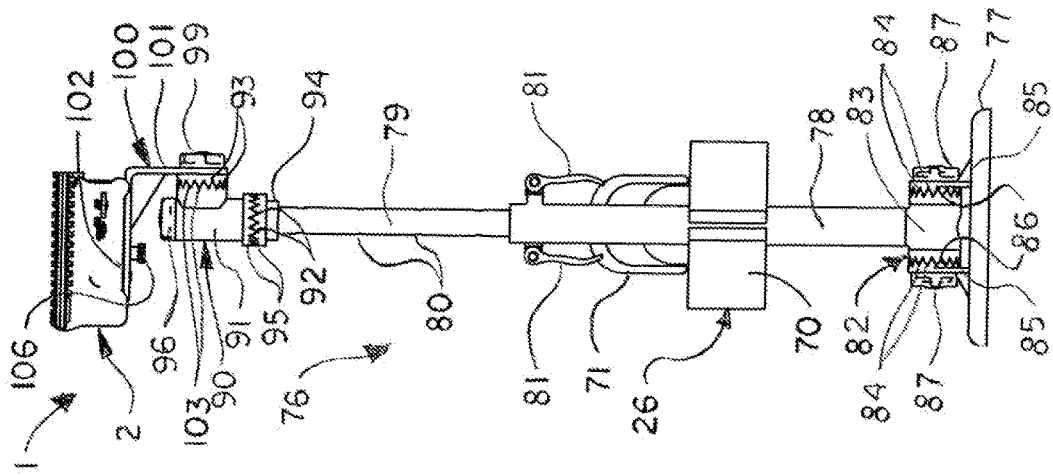

FISHING TOURNAMENT RECORDING AND VERIFYING SYSTEMS AND METHODS

CROSS-REFERENCE TO RELATED APPLICATIONS

This application claims the benefit of U.S. provisional application No. 63/060,895, filed Aug. 4, 2020, and entitled FISHING TOURNAMENT RECORDING AND VERIFYING SYSTEMS AND METHODS, which provisional application is hereby incorporated by reference herein in its entirety.

FIELD

Illustrative embodiments of the disclosure generally relate to fishing accessories. More particularly, illustrative embodiments of the disclosure relate to systems and methods suitable for ensuring honesty, accuracy and integrity in reporting and recording the sizes of fish caught in a fishing tournament.

SUMMARY

Illustrative embodiments of the disclosure are generally directed to fishing tournament recording and verifying systems suitable for ensuring honesty, accuracy and integrity in reporting and recording sizes of fish caught in a fishing tournament. An illustrative embodiment of the system may include at least one scale configured to obtain at least one measured weight of a fish. At least one head unit may communicably interface with the at least one scale. The at least one head unit may be configured to capture at least one image of the fish and pair the at least one image of the fish with the at least one measured weight. At least one external database may communicably interface with the at least one head unit. The at least one external database may be configured to receive weight and image data corresponding to the at least one measured weight paired with the at least one image of the fish. At least one personal electronic device may communicably interface with the at least one external database. The at least one personal electronic device may be configured to receive the weight and image data from the at least one external database. A mobile app may be provided on the at least one personal electronic device. The mobile app may be configured to present the at least one measured weight paired with the at least one image of the fish on the personal electronic device.

Illustrative embodiments of the disclosure are further generally directed to fishing tournament recording and verifying methods for ensuring honesty, accuracy and integrity in reporting and recording sizes of fish caught in a fishing tournament. An illustrative embodiment of the methods may include capturing and recording at least one image of at least one fish caught by a participant; obtaining and recording at least one weight of the at least one fish; displaying the at least one image with the at least one weight of the at least one fish; transmitting the at least one image and the at least one weight of the at least one fish to at least one database; and displaying the at least one image with the at least one weight on a mobile app on at least one personal electronic device.

BRIEF DESCRIPTION OF THE DRAWINGS

Illustrative embodiments of the disclosure will now be described, by way of example, with reference to the accompanying drawings, in which:

FIG. 3 is a front view of an illustrative embodiment of the fishing tournament recording and verifying systems, with a typical support structure supporting the system components:

FIG. 4 is a side view of the illustrative fishing tournament recording and verifying system illustrated in FIG. 3:

FIG. 5 is a rear view of the illustrative fishing tournament recording and verifying system illustrated in FIG. 3:

FIGS. 11A and 10B are functional block diagrams of an alternative illustrative embodiment of the fishing tournament recording and verifying systems.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. As used herein, "rear" and "front" shall refer to the respective rear and front portions of the fishing tournament recording and verifying system as they relate to typical positions of components of the system in typical use thereof. However, it will be recognized and understood that the systems are amenable to uses in which the components thereof labeled "front" and "rear" are located in alternative positions with respect to those portions of the system.

Figure 1:
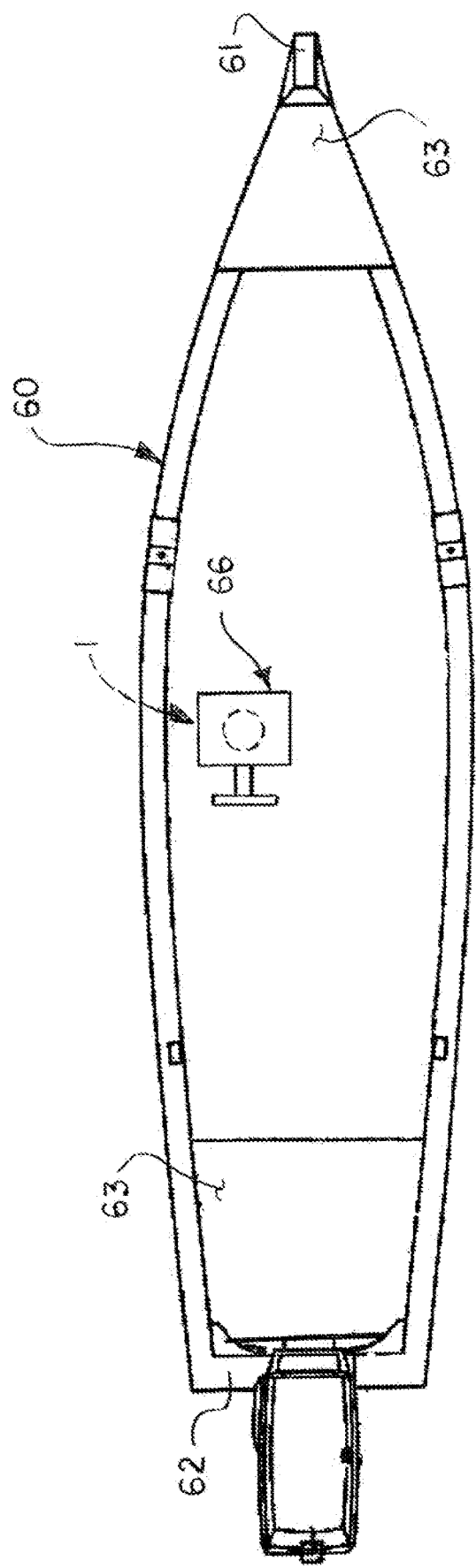
FIG. 1 is a top view of a typical boat with an illustrative embodiment of the fishing tournament recording and verifying systems (illustrated in phantom) deployed on a driver console in the boat in typical application of the systems.

Referring initially to FIG. 1 of the drawings, an illustrative embodiment of the fishing tournament recording and verifying systems, hereinafter system, is generally indicated by reference numeral 1. In typical application, which will be hereinafter described, at least one system 1 may be deployed in at least one location or position on a boat 60. For example and without limitation, the system 1 may be deployed on the boat deck 63 at or near the bow 61 and/or the stern 62 of the boat 60. In some embodiments, the system 1 may be deployed generally in the middle portion of the boat 60, such as on the driver console 66, for example and without limitation, as illustrated. The system 1 may capture, store and display video and/or still images of fish as the fish are caught by participants in the boat 60 during a fishing tournament, for example and without limitation, as well as weigh and record the weight of the caught fish and facilitate display of the image or images with the weight of the caught fish. Accordingly, the system 1 may ensure honesty, accuracy and integrity in reporting and recording the sizes of the fish caught during the fishing tournament in order to preserve the integrity of the tournament results.

Figure 2:
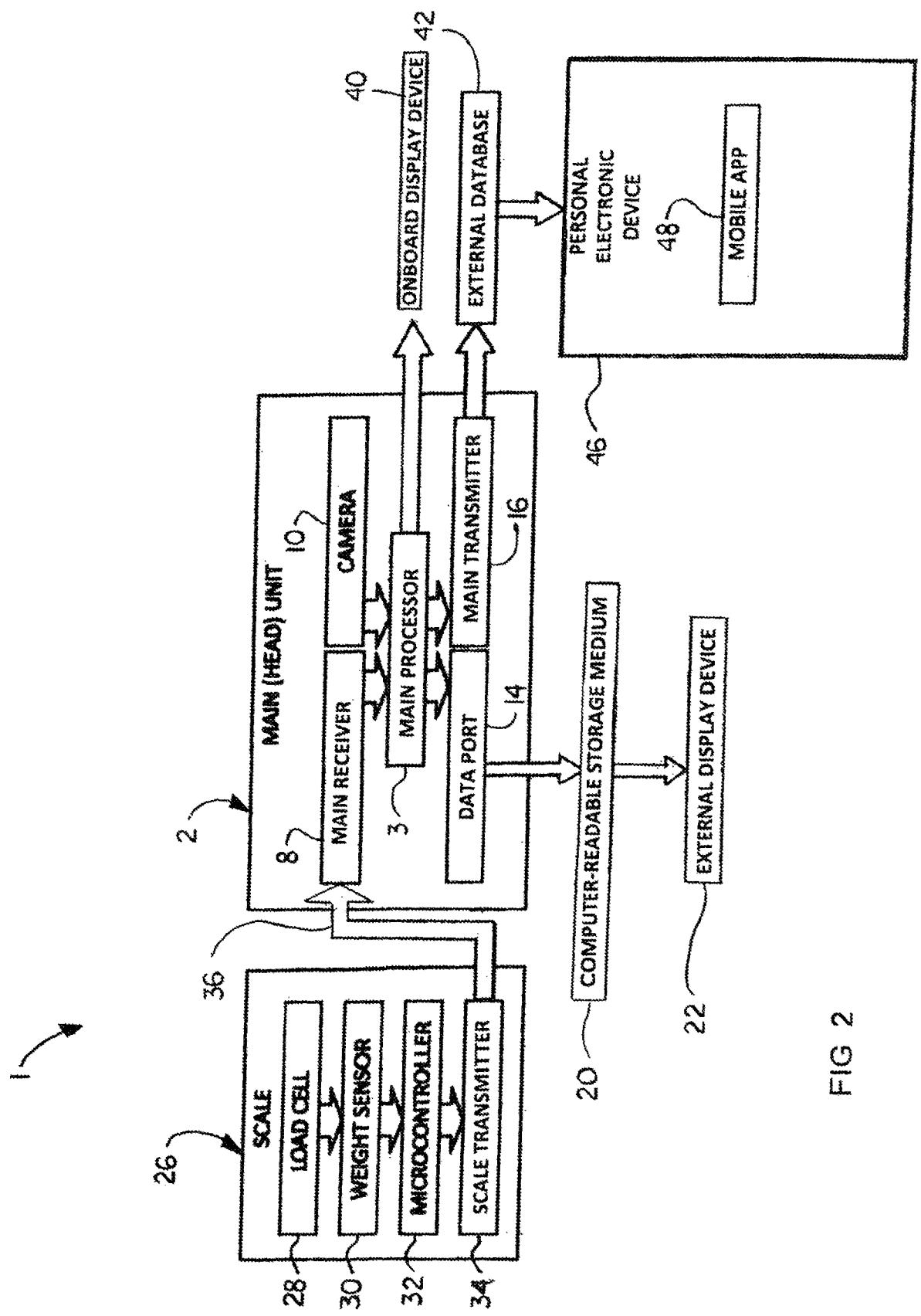
FIG. 2 is a functional block diagram of an illustrative embodiment of the fishing tournament recording and verifying systems.
Figure 8:
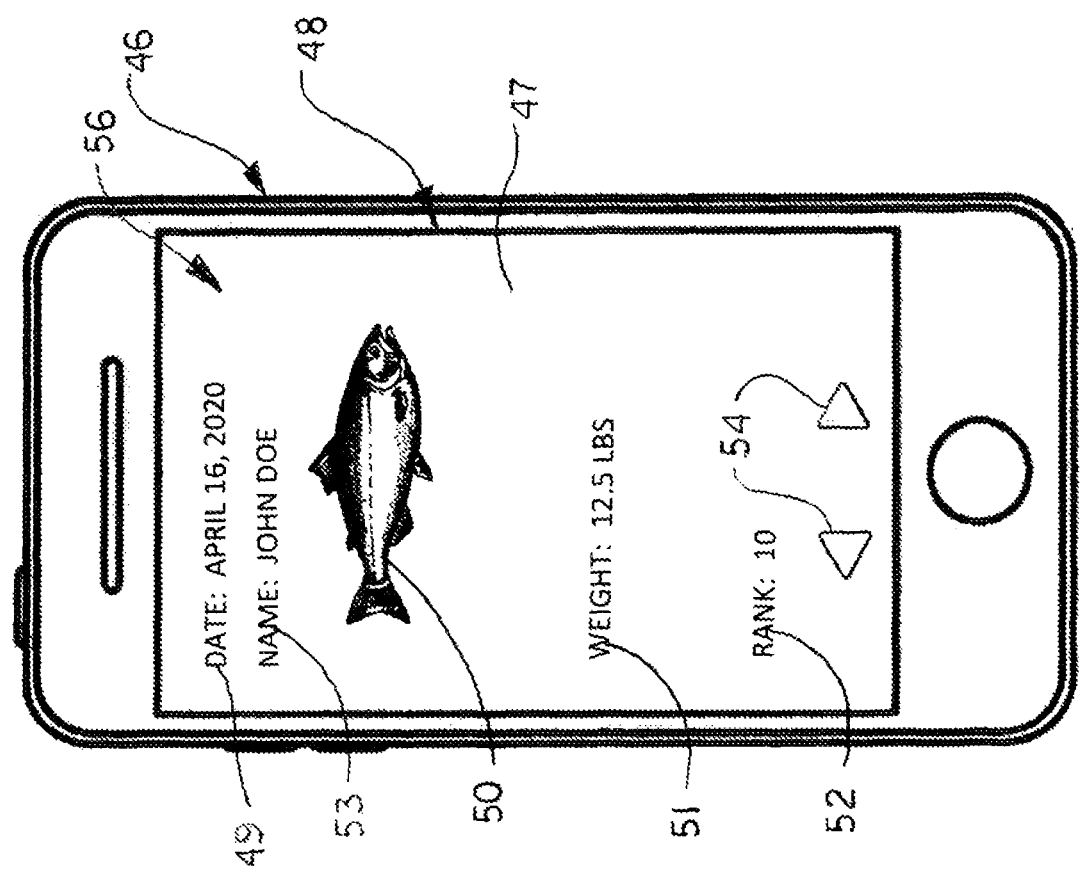
FIG. 8 is a front view of a typical personal electronic device with an illustrative mobile app opened on the display of the device in typical application of the fishing tournament recording and verifying systems.

Referring next to FIGS. 2 and 8 of the drawings, the system 1 may include at least one head unit 2 and at least one scales 26, as illustrated in FIG. 2. The scales 26 may be configured to weigh each fish which is caught by each tournament participant. The head unit 2 may be configured to receive the measured weight of the caught fish from the scales 26. The head unit 2 may be configured to capture at least one video image and/or at least one still image of each caught fish. The head unit 2 may further be configured to display the measured weight with the captured image or images of each fish, typically as will be hereinafter further described.

As further illustrated in FIG. 2, the scales 26 of the system 1 may include at least one load cell 28. At least one weight sensor 30 may operationally interface with the load cell 28. At least one microcontroller 32 may communicably interface with the weight sensor 30. In some embodiments, at least one scales transmitter 34 may communicably interface with the microcontroller 32. Accordingly, the scales transmitter 34 may be configured to transmit a wireless weight signal 36 which corresponds to the measured weight of each caught fish to the head unit 2. In some embodiments, the scale transmitter 34 may include at least one Bluetooth module, for example and without limitation. In some embodiments, the microcontroller 32 may be configured to transmit the measured weight of each fish to the head unit 2 through a hardwired and/or other communication pathway.

The load cell 28 may be configured to support at least one caught fish (not illustrated) for weighing according to the knowledge of those skilled in the art. Accordingly, in some embodiments, a scales cable (not illustrated) may mechanically engage the load cell 28. A scales hook (not illustrated) may be supported by the scales cable. In weighing a fish using the scales 26, the fish may be impaled on the scales hook such that the weight of the fish pulls against the scales cable. The weight sensor 30 may be configured to weigh the fish typically based on mechanical displacement of the load cell 28 via actuation of the scales cable.

The microcontroller 32 may be configured to receive the measured weight of the caught fish from the weight sensor 30. The microcontroller 32 may be further configured to transmit the measured weight to the head unit 2 typically via the scales transmitter 34, or alternatively, through a hardwired and/or other connection. In some embodiments, the microcontroller 32 may be configured to provide a time stamp to the measured weight of each fish. The time stamp may correspond to the time at which the measured weight of the fish was obtained. The microcontroller 32 may further include memory for indexing and storing the measured weights of the fish which are caught during the tournament.

As further illustrated in FIG. 2, the head unit 2 may include at least one main processor 3. The main processor 3 may be configured to implement the various operational functions of the system 1, typically as will be hereinafter described. In some embodiments, the main processor 3 may include at least one video processor. At least one main receiver 8 may interface with the main processor 3. Accordingly, the main receiver 8 may be configured to receive the measured weight of each caught fish from the microcontroller 32 of the scales 26, typically via the wireless weight signal 36 from the scales transmitter 34, and transmit the measured weight to the main processor 3. In some embodiments, the main receiver 8 may include at least one Bluetooth module, for example and without limitation.

At least one camera 10 may communicably interface with the main processor 3. In some embodiments, the camera 10 may include at least one video camera and/or at least one still camera. Each camera 10 may be configured to capture at least one video image and/or at least one still image of each caught fish. In some embodiments, each camera 10 may include a wide lens camera which is capable of covering a sweep of least 270 degrees on the deck of the boat 60 (FIG. 1). In typical application of the system 1, the camera 10 may include at least one video camera which takes a continuous video recording of the entire tournament.

Each camera 10 may be configured to transmit at least one image signal which corresponds to the captured image of each caught fish to the main processor 3. In some embodiments, the head unit 2 may include two mor more cameras 10 oriented in perpendicular relationship or at 90-degree or right angles with respect to each other. In some embodiments, the cameras 10 may be oriented in 180-degree relationship with each other, with one camera 10 typically oriented toward the bow 61 and the other camera 10 typically oriented toward the stern 62 of the boat 60 to facilitate substantially complete coverage of the entire boat 60.

The main processor 3 of the head unit 2 may be programmed to pair the weight data with the image data of each caught fish. The main processor 3 may include suitable memory to index and store the paired weight and image data of each caught fish for later retrieval. The main processor 3 may be further configured to provide a time stamp which indicates the time at which the measured weight and/or the image or images of each fish were obtained.

At least one data port 14 may communicably interface with the main processor 3. The data port 14 may be configured to transfer the paired weight and image data of each caught fish from the main processor 3 to at least one computer-readable storage medium 20. In some embodiments, the data port 14 may include at least one SD card reader and the computer-readable storage medium 20 may include at least one SI) card. In other embodiments, the data port 14 may include at least one USB port or other type of data port and the computer-readable storage medium 20 may include at least one thumb drive or other computer-readable storage medium known by those skilled in the art. The computer-readable storage medium 20 may be readable by at least one external display device 22. In some embodiments, the external display device 22 may include at least one video playing device, for example and without limitation.

At least one onboard display device 40 may interface with the main processor 3 of the head unit 2 through a wireless, hardwired and/or other communication pathway. In some embodiments, the onboard display device 40 may include at least one onboard video playing device. In some embodiments, the onboard display device 40 may include at least one still image display device. In some embodiments, the onboard display device 40 may include both at least one video playing device and at least one still image display device.

At least one external database 42 may communicably interface with the main processor 3 of the head unit 2. In some embodiments, at least one main transmitter 16 may interface with the main processor 3. The external database 42 may wirelessly communicate with the main processor 3 through the main transmitter 16. Accordingly, the external database 42 may be configured to receive the paired weight and image data of each caught fish from the main processor 3 typically wirelessly via the main transmitter 16. In some embodiments, the main transmitter 16 may include at least one 4G data module and the external database 42 may include at least one cloud database. In some embodiments, the external database 42 may interface with the main processor 3 of the head unit 2 through a hardwired and/or other communication pathway.

As further illustrated in FIG. 2, in typical application of the system 1, which will be hereinafter further described, each participant in the fishing tournament may possess at least one personal electronic device 46. Each personal electronic device 46 may include a smartphone, tablet or the like which has a display 47 (FIG. 8) capable of displaying images. Each personal electronic device 46 may be functionally capable of supporting a mobile app 48.

As illustrated in FIG. 8, the mobile app 48 on each personal electronic device 46 may be programmed to present a screenshot 56 on the display 47. The screenshot 56 may include the captured image 50 of each fish which is caught by each tournament participant. The screenshot 56 may include various data such as the date 49 of the fishing tournament, the name 53 of each tournament participant, and the weight 51 and rank 52 of the caught fish, for example and without limitation.

In some embodiments, the screenshot 56 on the mobile app 48 may include forward and reverse scroll buttons 54 on the display 47. Accordingly, the scroll buttons 54 may enable each tournament participant to advance or scroll through the screenshots 56 of each of the other participants in the tournament as those screenshots 56 successively appear on the display 47 responsive to touching or otherwise actuating the scroll buttons 54. In some embodiments, the mobile app 48 may be programmed to list the names of the tournament participants along with the weights and ranks of the fish caught by those tournament participants in columnar and/or other form on the display 47. The mobile app 48 may be programmed to continually update the captured image and weight data of the fish as the fish are caught by the tournament participants. The mobile app 48 may be password-protected and may include provisions for enabling each participant to register and pay for entry into the fishing tournament, according to the knowledge of those skilled in the art.

Referring next to FIGS. 3-7 of the drawings, in some embodiments, the system 1 may include at least one support structure 76. Each support structure 76 may be configured to support and centralize the head unit 2 and/or the scales 26 on the boat 60 (FIG. 1). The support structure 76 may have any design which is suitable for the purpose. In some embodiments, each support structure 76 may include a base 77. The base 77 may be configured for attachment to the boat deck 63 and/or other portion of the boat 60 (FIG. 1) using bolts, brackets and/or other suitable fastening technique (not illustrated). An elongated receptacle 78 may extend upwardly from the base 77. An elongated support arm 79 may be telescopically extendable from the receptacle 78. The support arm 79 may be extended to and secured at a selected height from the receptacle 78 according to the knowledge of those skilled in the art. Accordingly, in some embodiments, at least one series of spaced-apart adjustment openings 80 may be provided along the length of the support arm 79. At least one pivoting adjustment handle 81 may be provided on the receptacle 78. Each adjustment handle 81 may be configured to engage a corresponding one of the adjustment openings 80 to secure the support arm 79 at the selected height from the receptacle 78.

Figure 6:
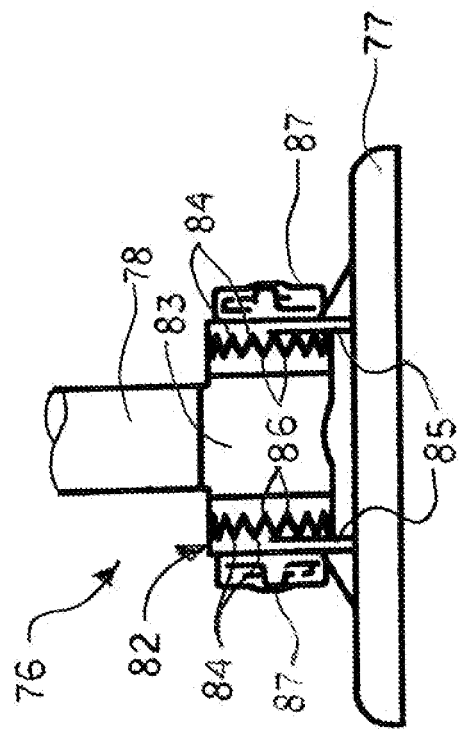
FIG. 6 is an enlarged front view of a typical receptacle adjustment assembly which is suitable for adjusting the vertical angle of the receptacle with respect to the base of the support structure (shown partially in section)

In some embodiments, the receptacle 78 may be pivotally mounted with respect to the base 77 of the support structure 76. Accordingly, as illustrated in FIG. 4, the receptacle 78 and the support arm 79 may be capable of pivoting in a vertical plane to a selected vertical angle with respect to the base 77. A receptacle adjustment assembly 82 may facilitate securement of the receptacle 78 at the selected vertical angle. The receptacle adjustment assembly 82 may have any design which is suitable for the purpose. As illustrated in FIGS. 3, 5 and 6, in some embodiments, the receptacle adjustment assembly 82 may include a receptacle adjustment head 83 which may terminate the lower end of the receptacle 78. A series of adjustment head teeth 84 may be arranged in a circular pattern typically in a vertical plane on each side of the receptacle adjustment head 83. A pair of spaced-apart assembly mount flanges 85 may extend upwardly from the base 77. A series of flange teeth 86 may be arranged in a circular pattern typically in a vertical plane on the facing surface of each assembly mount flange 85. The flange teeth 86 on each assembly mount flange 85 may mesh with the companion adjustment head teeth 84 on each corresponding side of the receptacle adjustment head 83. A tension adjustment knob 87 may abut against each assembly mount flange 85 and threadably engage the receptacle adjustment head 83 to normally bias the adjustment head teeth 84 and the flange teeth 86 into meshing relationship to each other. The tension adjustment knobs 87 may be selectively loosened to facilitate disengagement of the flange teeth 86 from the adjustment head teeth 84 and facilitate pivoting of the receptacle 78 relative to the base 77, as illustrated in FIG. 4. The tension adjustment knobs 87 may be tightened to facilitate engagement of the adjustment head teeth 84 with the flange teeth 86 and secure or lock the receptacle 78 at the selected vertical angle relative to the base 77.

The head unit 2 may be mounted on the support arm 79 of the support structure 76 according to the knowledge of those skilled in the art. In some embodiments, a mount bracket 100 may mount the head unit 2 on the support arm 79. The mount bracket 100 may include a vertical side bracket portion 101 which is supported by the support arm 79 and a horizontal top bracket portion 102 which may extend perpendicularly from the side bracket portion 101.

Figure 7:
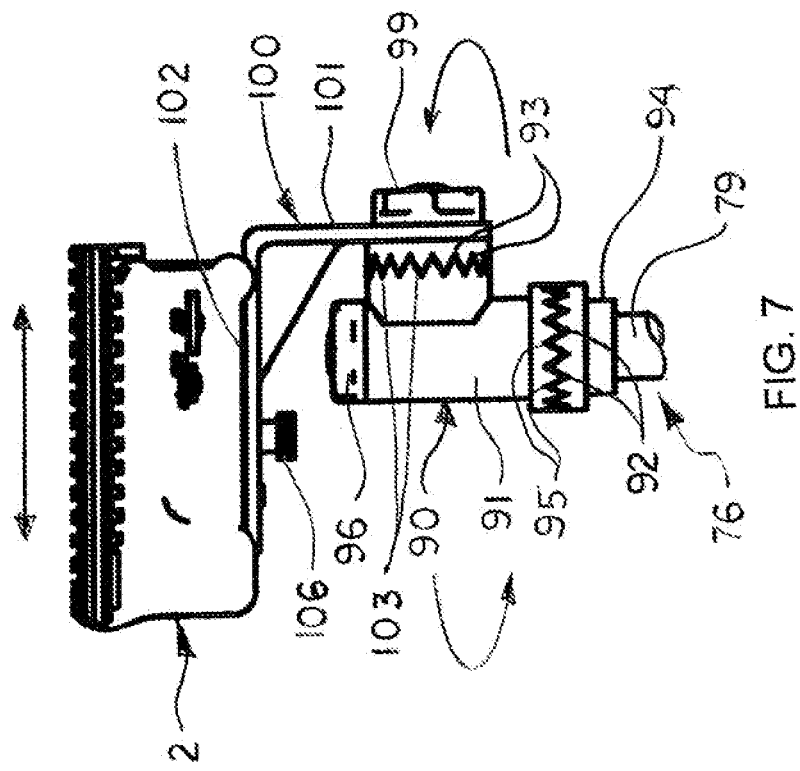
FIG. 7 is an enlarged front view of a typical head unit adjustment assembly which is suitable for adjusting the rotational position and tilt angle of the head unit with respect to the support arm of the support structure.

In some embodiments, the head unit 2 may be adjustably mounted on the top bracket portion 102 of the mount bracket 100 according to the knowledge of those skilled in the art. Accordingly, as illustrated in FIG. 7, the head unit 2 may be selectively adjustable in position along the horizontal axis of the top bracket portion 102. In some embodiments, an elongated bracket slot (not illustrated) may extend through the top bracket portion 102 of the mount bracket 100. A position adjustment knob 106 may extend through the bracket slot and threadably engage a knob opening (not illustrated) in the head unit 2. The position adjustment knob 106 may be selectively loosened to facilitate sliding adjustment of the head unit 2 along the top bracket portion 102 and tightened against the top bracket portion 102 to secure the head unit 2 at the selected position thereon.

In some embodiments, a head unit adjusting assembly 90 may mount the mount bracket 100 to the support arm 79. The head unit adjusting assembly 90 may have any design which is suitable for the purpose. As illustrated in FIGS. 3, 5 and 7, in some embodiments, the head unit adjusting assembly 90 may include a head unit adjusting head 91. A series of lower adjustment head teeth 92 may be arranged in a circular pattern and typically oriented in a horizontal plane on the head unit adjusting head 91. An arm cap 94 may be provided on the upper end of the support arm 79. A series of arm cap teeth 95 may be arranged in a circular pattern and typically oriented in a horizontal plane on the arm cap 94. The lower adjustment head teeth 92 on the head using adjusting head 91 may mesh with the companion arm cap teeth 95 on the arm cap 94. A tension adjustment knob 96 on the head adjustment head 91 may threadably engage the arm cap 94. Accordingly, the tension adjustment knob 96 may be loosened to facilitate disengagement of the lower adjustment head teeth 92 from the arm cap teeth 95 and rotation of the head unit 2 about a vertical axis relative to the support arm 79, as indicated in FIG. 7. The tension adjustment knob 96 may be selectively tightened to facilitate engagement of the lower adjustment head teeth 92 with the arm cap teeth 95 and prevent further rotation of the head unit 2 relative to the support arm 79.

As further illustrated in FIGS. 3, 5 and 7, the head unit adjusting assembly 90 may further include a series of side adjustment head teeth 93 arranged in a circular pattern and typically oriented in a vertical plane on the head unit adjusting head 91. A series of bracket teeth 103 may be arranged in a circular pattern and typically oriented in a vertical plane on the side bracket portion 101 of the mount bracket 100. The bracket teeth 103 on the mount bracket 100 may mesh with the side adjustment head teeth 93 on the head unit adjusting head 91. A tension adjustment knob 99 may abut against the mount bracket 100 and threadably engage the head unit adjusting head 91. Accordingly, the tension adjustment knob 99 can be selectively loosened to facilitate disengagement of the bracket teeth 103 from the side adjustment head teeth 93 and selective tilting of the head unit 2 at a selected tilt angle with respect to a horizontal plane, as indicated in FIG. 4. The tension adjustment knob 99 can be selectively tightened to facilitate engagement of the bracket teeth 103 with the side adjustment head teeth 93 and secure the head unit 2 at the selected tilt angle.

As illustrated in FIGS. 3-5, in some embodiments, the scales 26 may be provided on the support structure 76 of the system 1. Accordingly, the scales 26 may include a scales housing 70. The scales housing 70 may at least partially contain or enclose the various functional components of the scales 26 such as the load cell 28 (FIG. 2), the weight sensor 30, the microcontroller 32 and the sale transmitter 34 (FIG. 2), for example and without limitation. The scales cable (not illustrated) which mechanically engages the load cell 28 (FIG. 2) may extend through a cable slot (not illustrated) in the bottom of the scales housing 70. A scales handle 71 may extend from the scales housing 70. A scales display 72 may be provided on the exterior of the sales housing 70. The scales display 72 may communicably interface with the microcontroller 32 (FIG. 2) of the scales 26. Accordingly, the microcontroller 32 may be programmed to display the measured weight of each fish as the fish is measured using the scales 26. The scales housing 70 of the scales 26 may be detachably attached to the receptacle 78 of the support structure 76 according to the knowledge of those skilled in the art, such as by using brackets and/or mechanical fasteners, for example and without limitation.

Referring next to FIGS. 1-8 of the drawings, in typical application, at least one system 1 may be installed on a boat 60 which will be used to support participants in a fishing tournament (not illustrated) on a body of water typically in a bass tournament or the like. Accordingly, as illustrated in FIG. 1, the system or systems 1 may be installed at any of one or more desired locations in the boat 60 which enables the camera or cameras 10 (FIG. 2) to cover a sweep of least 270 degrees on the deck of the boat 60. For example and without limitation, in some applications, the system 1 may be installed at or adjacent to the bow 61 of the boat 60. In some applications, the system 1 may be installed at or adjacent to the stern 62 of the boat 60. In still other applications, the system 1 may be installed between the bow 61 and the stern 62.

The system 1 may be attached to the driver console 66, as illustrated, or alternatively, to the boat deck 63 typically at or adjacent to the bow 61 or the stern 62 of the boat 60. In some applications, this may be accomplished by, for example and without limitation, attaching the base 77 of the support structure 76 (FIGS. 3-5) to the driver console 66 or boat deck 63 using bolts, brackets and/or other suitable fastening technique (not illustrated) known by those skilled in the art.

In some embodiments, the position of the head unit 2 may be selected to achieve the desired height, position and orientation of the camera or cameras 10 in order to obtain the broadest or widest viewing coverage for the cameras 10. This may be accomplished by, for example and without limitation, adjusting the height of the support structure 76 by extending the support arm 79 from the receptacle 78 and engaging the adjusting handle or handles 81; adjusting the angular position of the receptacle 78 relative to the base 77 of the support structure 76 (FIG. 4) typically by manipulation of the receptacle adjustment assembly 82; adjusting the rotational position of the heat unit 2 relative to the support arm 79 (FIG. 7) of the support structure 76 typically by manipulation of the tension adjustment knob 96 of the head unit adjustment assembly 90; adjusting the tilting position of the head unit 2 (FIG. 4) typically by manipulation of the tension adjustment knob 99 of the head unit adjustment assembly 90; and/or adjusting the linear or horizontal position of the head unit 2 along the top bracket portion 102 of the mount bracket 100 (FIG. 7) typically by manipulation of the position adjustment knob 106.

After each participant in the tournament catches a fish (not illustrated), the scales 26 may be removed from the support structure 76 of the system 1. The fish may be removed from the hook on the fishing line of the tournament participant's rod and reel (not illustrated) and typically attached to the scales hook (not illustrated) of the scales 26. As the scales 26 are held typically by gripping the scales handle 71, the load cell 28 (FIG. 2) is mechanically displaced and the weight sensor 30 senses and transmits the measured weight to the microcontroller 32. In some embodiments, the microcontroller 32 may indicate the measured weight of the fish on the scales display 72 (FIGS. 3 and 5) of the scales 26. The microcontroller 32 may transmit the weight data which corresponds to the measured weight to the main processor 3 of the head unit 2 typically wirelessly via the scale transmitter 34 (FIG. 2) of the scales 26 and the main receiver 8 of the head unit 2.

The camera or cameras 10 may capture at least one video image and/or still image of the caught fish and transmit the image data which corresponds to the captured image or images to the main processor 3 of the head unit 2. In some embodiments, the cameras 10 may obtain a continuous video film throughout the duration of the tournament, with one of the cameras typically filming the portion of the boat 60 which is forward of the driver console 66 (FIG. 1) and the other camera typically filming the portion of the boat 60 which is behind the driver console 66. The main processor 3 may pair the weight data with the image data of each caught fish. The main processor 3 may index and store the paired weight and image data of each caught fish for later retrieval. In some embodiments, the main processor 3 may transmit the weight data and image data of each caught fish to the onboard display device 40.

The main processor 3 may transmit the paired weight data and image data of each caught fish to the external database 42, typically wirelessly via the main transmitter 16. Each tournament participant may open the mobile app 48 on his or her personal electronic device 46. Accordingly, as illustrated in FIG. 8, the mobile app 48 may present data such as the date of the fishing tournament 49, the name of each tournament participant 53, the captured image 50 of the caught fish, the weight 51 of the caught fish and the rank 52 of the fish, for example and without limitation, on the screenshot 56 which appears on the display 47 of the personal electronic device 46. In some embodiments, each tournament participant may scroll through the screenshots 56 of the other tournament participants in the tournament typically using the forward and reverse scroll buttons 54. In some embodiments, the mobile app 48 may list the names of the tournament participants along with the weights and ranks of the fish caught by those tournament participants in columnar and/or other form on the display 47. The mobile app 48 may continually update the captured image and weight data of the fish as the fish are caught by the tournament participants.

Upon conclusion of the tournament, the judge or judges of the tournament may determine the winner of the tournament based on the weight and image data obtained by the scales 26 and camera or cameras 10 of the head unit 2, respectively. As illustrated in FIG. 2, in some applications, a computer-readable medium 20, such as an SD card, for example and without limitation, may be interfaced with the data port 14 to transfer the weight and image data of each caught fish from the main processor 3 onto the computer-readable storage medium 20. The computer-readable medium 20 may subsequently be interfaced with an external display device 22, such as a video playing device, for example and without limitation, to enable the judge or judges of the tournament to review the images and weights of the captured fish for verification purposes.

In some embodiments, the system 1 may include a security function or mode (not illustrated) which enables the system 1 to monitor the area of the boat 60 and the surroundings around the boat 60 for security purposes. The security function may include at least one motion sensor and one or more lights such as LEDs provided on the head unit 2, support structure 76 and/or other component or components of the system 1. The motion sensor or sensors and the light or lights may interface with the main processor 3 (FIG. 2) of the head unit 2. Accordingly, in the event that the motion sensor senses activity in or around the boat 60, the main processor 3 may be configured to activate the light or lights such that the lights illuminate the monitored area, as well as operate the camera or cameras 10 to capture video and/or other images of the illuminated area. The main processor 3 may be configured to transmit the captured image or images to the extema database 42, typically via the main transmitter 16, such that the image or images may be viewed in real time on the same or a different mobile app 48 on the personal electronic device 46. In some embodiments, the captured image or images may be storable in the memory of the main processor 3 for later retrieval. At least one security mode activation switch (not illustrated) may interface with the main processor 3 to facilitate selective activation of the system 1 to the security mode. In some embodiments, the mobile app 48 on the personal electronic device 46 may include the switch function to enable remote activation and deactivation of the system 1 using the personal electronic device 46.

Figure 9:
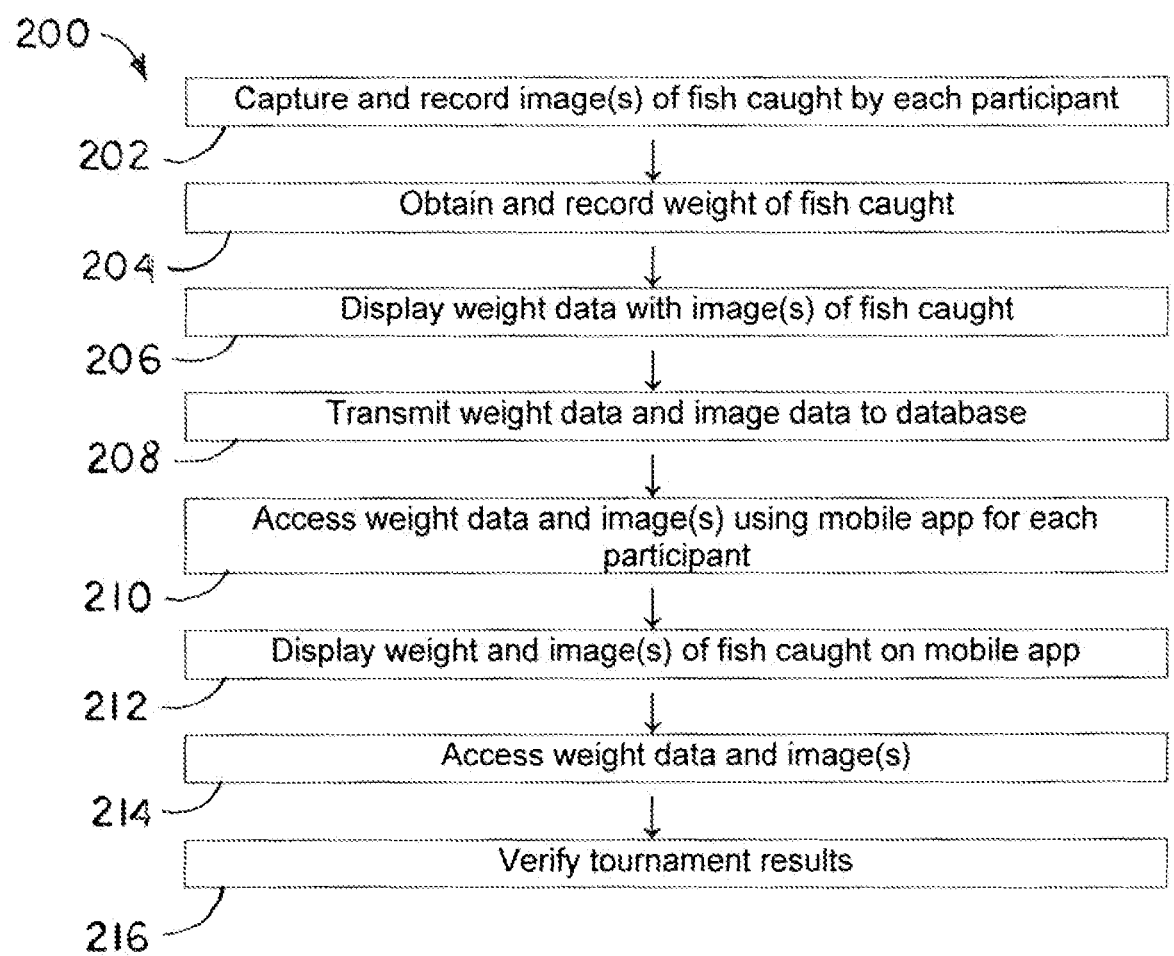
FIG. 9 is a flow diagram of an illustrative embodiment of the fishing tournament recording and verifying methods of the disclosure.

Referring next to FIG. 9 of the drawings, a flow diagram 200 of an illustrative embodiment of the fishing tournament recording and verifying methods of the disclosure is illustrated. At Step 202, at least one image of a fish caught by each participant in a fishing tournament may be captured and recorded. In some embodiments, the at least one image may include at least one video image.

In some embodiments, the at least one image may include at least one still image. In some embodiments, the at least one image may include at least one video image and at least one still image. In some embodiments, the cameras may obtain a continuous video film throughout the duration of the tournament, with one of the cameras typically filming the portion of the boat which is forward of the driver console and the other camera typically filming the portion of the boat which is behind the driver console.

At Step 204, the weight of each caught fish may be obtained and recorded.

At Step 206, the weight data with the image or images of each caught fish may be displayed.

At Step 208, the weight data and the image data may be transmitted to at least one database.

At Step 210, the weight data and the image or images may be accessed on a personal electronic device possessed by each tournament participant using a mobile app.

At Step 212, the weight and image or images of each caught fish may be displayed using the mobile app.

At Step 214, the weight data and the image data may be accessed.

At Step 216, the tournament results may be verified using the weight data and the image data accessed in Step 214.

Figure 10A:
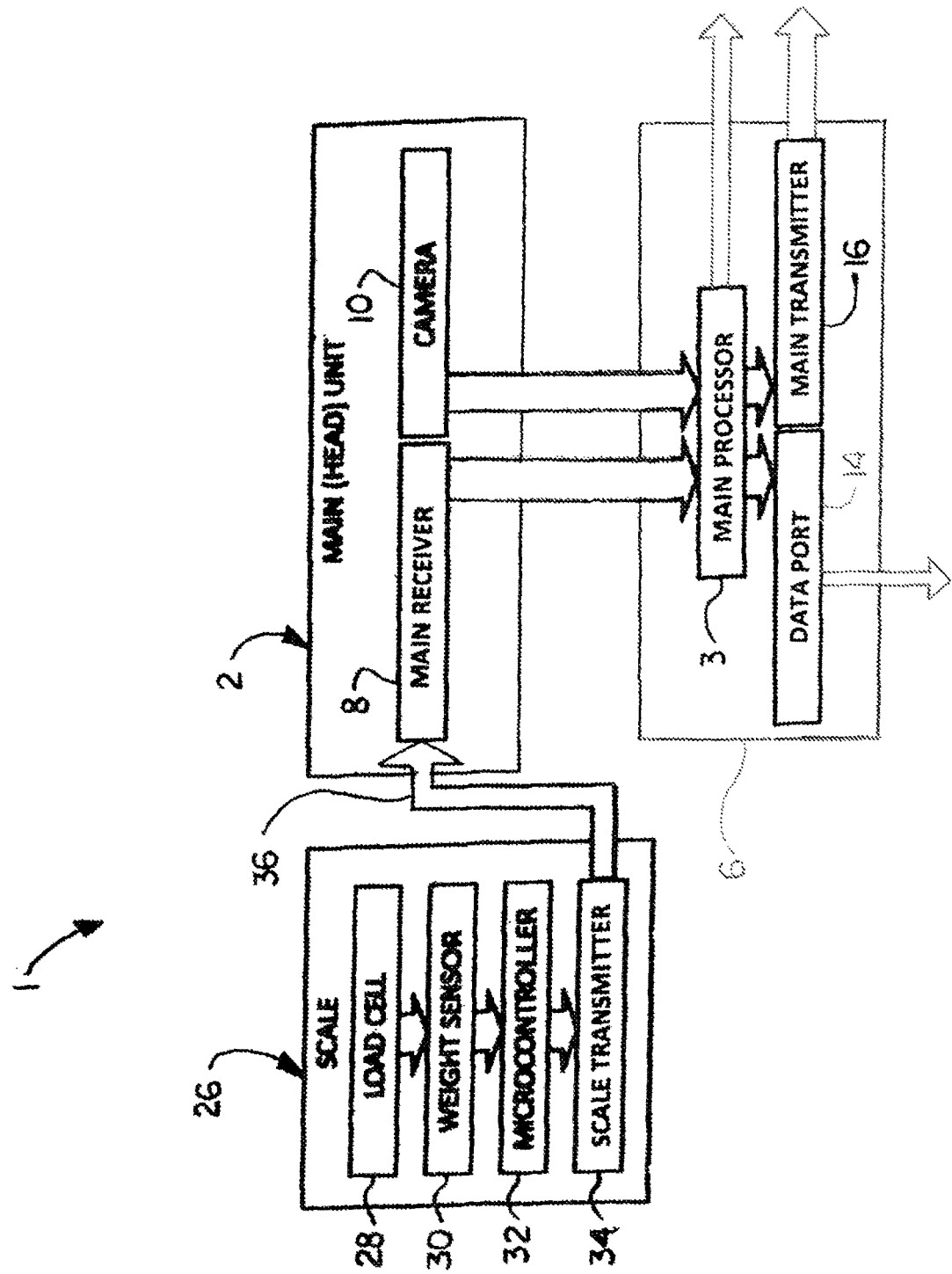
Figure 10B:
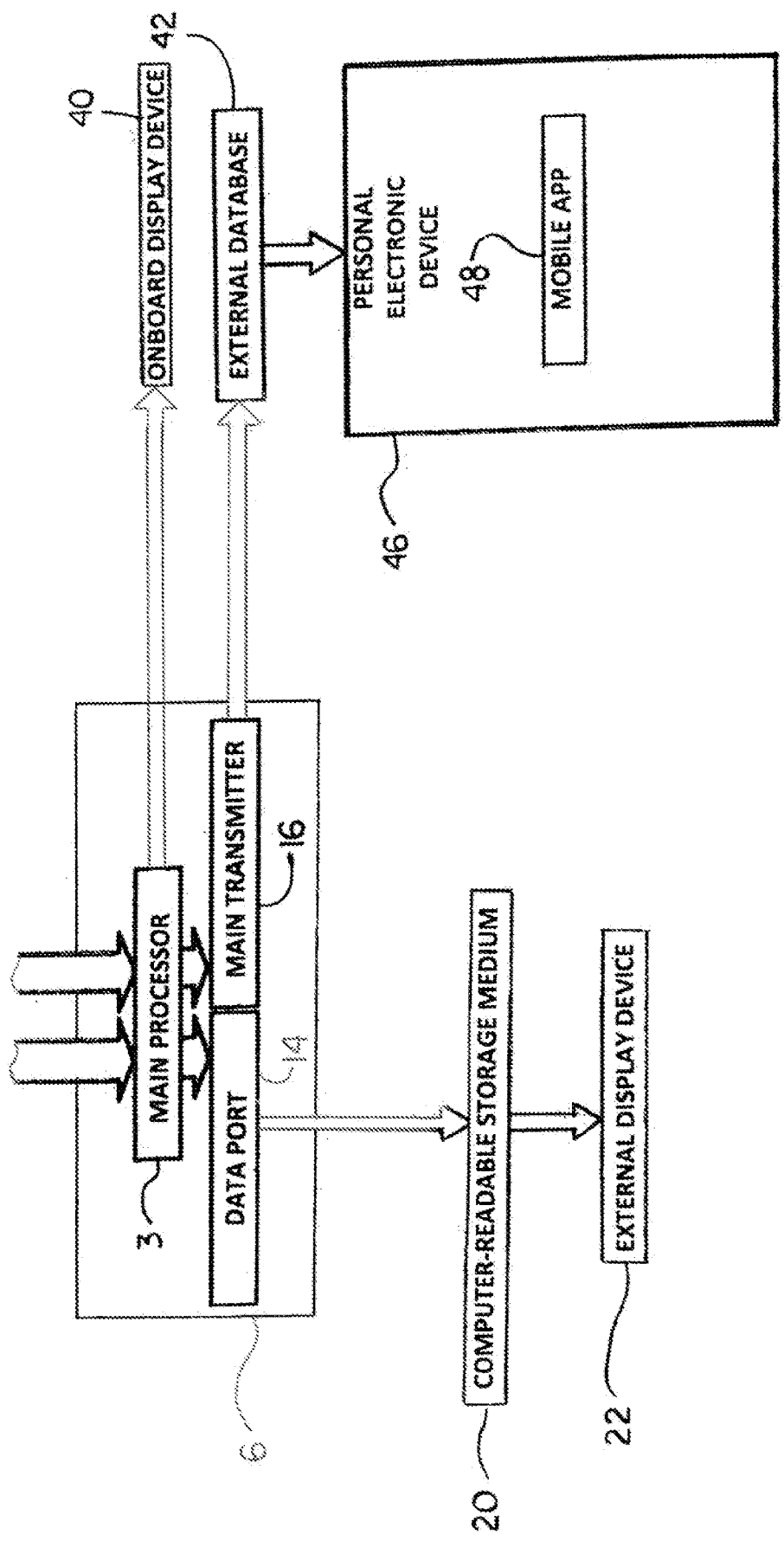

Referring to FIGS. 10A and 10B of the drawings, in some embodiments of the fishing tournament recording and verifying system 1, the main processor 3 may be contained in a main processor housing 6 which is separate from the head unit 2. The main processor housing 6 may be installed under the driver console 66 (FIG. 1) of the boat 60, for example and without limitation, or in any other suitable or desired location on the boat 60. Components associated with the main processor 3, such as the data port 14, the main transmitter 16 and/or motion sensors, for example and without limitation, may be included in the main processor housing 6. Application of the fishing tournament recording and verifying system 1 may be as was heretofore described.

While illustrative embodiments of the disclosure have been described above, it will be recognized and understood that various modifications can be made and the appended claims are intended to cover all such modifications which may fall within the spirit and scope of the disclosure.

What is claimed is:

1. A fishing tournament recording and verifying system suitable for ensuring honesty, accuracy and integrity in reporting and recording sizes of fish caught in a fishing tournament, comprising:
   a support structure configured for deployment on a boat;
   at least one scales carried by the support structure, the at least one scales configured to obtain at least one measured weight of a fish;
   at least one head unit carried by the support structure, the at least one head unit communicably interfacing with the at least one scales, the at least one head unit configured to capture at least one image of the fish and pair the at least one image of the fish with the at least one measured weight;
   at least one external database communicably interfacing with the at least one head unit, the at least one external database configured to receive weight and image data corresponding to the at least one measured weight paired with the at least one image of the fish;
   at least one personal electronic device communicably interfacing with the at least one external database, the at least one personal electronic device configured to receive the weight and image data from the at least one external database; and
   a mobile app on the at least one personal electronic device, the mobile app configured to present the at least one measured weight paired with the at least one image of the fish on the personal electronic device.

2. The system of claim 1 wherein the at least one scales comprises a scales housing, a scales display on the scales housing and a scales handle extending from the scales housing, and the at least one scales is detachably carried by the support structure.

3. A fishing tournament recording and verifying system suitable for ensuring honesty, accuracy and integrity in reporting and recording sizes of fish caught in a fishing tournament, comprising:
   at least one scales configured to obtain at least one measured weight of a fish;
   at least one head unit communicably interfacing with the at least one scales, the at least one head unit configured to capture at least one image of the fish and pair the at least one image of the fish with the at least one measured weight;
   at least one external database communicably interfacing with the at least one head unit, the at least one external database configured to receive weight and image data corresponding to the at least one measured weight paired with the at least one image of the fish;
   at least one personal electronic device communicably interfacing with the at least one external database, the at least one personal electronic device configured to receive the weight and image data from the at least one external database;
   a mobile app on the at least one personal electronic device, the mobile app configured to present the at least one measured weight paired with the at least one image of the fish on the personal electronic device; and
   wherein the support structure comprises a base, a receptacle carried by the base and a support arm carried by the receptacle, and the at least one head unit is carried by the support arm.

4. The system of claim 1 wherein the at least one head unit is positionally adjustable with respect to the support arm structure.

5. A fishing tournament recording and verifying system suitable for ensuring honesty, accuracy and integrity in reporting and recording sizes offish caught in a fishing tournament, comprising:
   a support structure configured for deployment on a boat;
   at least one scales configured to obtain at least one measured weight of a fish;
   at least one head unit carried by the support structure, the at least one head unit positionally adjustable with respect to the support structure, the at least one head unit communicably interfacing with the at least one scales, the at least one head unit configured to capture at least one image of the fish and pair the at least one image of the fish with the at least one measured weight;
   at least one external database communicably interfacing with the at least one head unit, the at least one external database configured to receive weight and image data corresponding to the at least one measured weight paired with the at least one image of the fish;
   at least one personal electronic device communicably interfacing with the at least one external database, the at least one personal electronic device configured to receive the weight and image data from the at least one external database; and
   a mobile app on the at least one personal electronic device, the mobile app configured to present the at least one measured weight paired with the at least one image of the fish on the personal electronic device; and
   a mount bracket carried by the support arm, and wherein the at least one head unit is horizontally adjustable on the mount bracket.

6. The system of claim 5 further comprising a head unit adjusting assembly rotatably adjustably carried by the support arm about a vertical axis, and wherein the mount bracket is rotatably adjustably carried by the head unit adjusting assembly about a horizontal axis.

7. A fishing tournament recording and verifying system suitable for ensuring honesty, accuracy and integrity in reporting and recording sizes of fish caught in a fishing tournament, comprising:
   a support structure for deployment on a boat, the support structure comprising:
      a base configured for attachment to the boat;
      a receptacle adjustment assembly carried by the base;
      a receptacle carried by the receptacle adjustment assembly, the receptacle capable of pivoting in a vertical plane to a selected vertical angle with respect to the base;
      a support arm carried by and telescopically extendable from the receptacle;
      a head unit adjusting assembly rotatably adjustably carried by the support arm about a vertical axis; and
      a mount bracket rotatably adjustably carried by the head unit adjusting assembly about a horizontal axis;
   at least one scales carried by the support structure, the at least one scales configured to obtain at least one measured weight of a fish;
   at least one head unit carried by and horizontally adjustable on the mount bracket, the at least one head unit communicably interfacing with the at least one scales, the at least one head unit having at least one camera configured to capture at least one image of the fish and pair the at least one image of the fish with the at least one measured weight;

at least one external database communicably interfacing with the at least one head unit, the at least one external database configured to receive weight and image data corresponding to the at least one measured weight paired with the at least one image of the fish;

at least one personal electronic device communicably interfacing with the at least one external database, the at least one personal electronic device configured to receive the weight and image data from the at least one external database; and a mobile app on the at least one personal electronic device, the mobile app configured to present the at least one measured weight paired with the at least one image of the fish on the personal electronic device.

8. The system of claim 7 wherein the at least one scales comprises a scales housing, a scales display on the scales housing and a scales handle extending from the scales housing.

9. The system of claim 7 wherein the at least one scales is detachably carried by the support structure.

10. The system of claim 7 wherein the at least one camera comprises a plurality of cameras.

11. The system of claim 10 wherein the cameras are oriented at a 90-degree angle to each other.

12. The system of claim 10 wherein the cameras are oriented in 180-degree relationship with each other.

13. The system of claim 7 wherein the mount bracket comprises a vertical side bracket portion carried by the support arm and a horizontal top bracket portion extending perpendicularly from the side bracket portion, and the at least one head unit is carried by the top bracket portion.

14. The system of claim 7 further comprising a main processor, and wherein the head unit comprises a main receiver interfacing with the main processor, the main receiver configured to receive the at least one measured weight of the fish from the at least one scales and transmit the measured weight to the main processor.

15. The system of claim 14 wherein the head unit comprises the main processor.

16. The system of claim 14 further comprising a main processor housing, and wherein the main processor is provided in the main processor housing.

17. The system of claim 14 further comprising a data port interfacing with the main processor, a computer-readable storage medium interfacing with the data port and an external display device interfacing with the computer-readable storage medium.

18. A fishing tournament recording and verifying method for ensuring honesty, accuracy and integrity in reporting and recording sizes of fish caught in a fishing tournament, comprising:

deploying a fishing tournament recording and verifying system comprising:

a support structure;

at least one scales carried by the support structure, the at least one scales configured to obtain at least one measured weight of a fish;

at least one head unit carried by the support structure, the at least one head unit communicably interfacing with the at least one scales, the at least one head unit configured to capture at least one image of the fish and pair the at least one image of the fish with the at least one measured weight;

at least one external database communicably interfacing with the at least one head unit, the at least one external database configured to receive weight and image data corresponding to the at least one measured weight paired with the at least one image of the fish;

at least one personal electronic device communicably interfacing with the at least one external database, the at least one personal electronic device configured to receive the weight and image data from the at least one external database; and a mobile app on the at least one personal electronic device, the mobile app configured to present the at least one measured weight paired with the at least one image of the fish on the personal electronic device;

capturing and recording at least one image of at least one fish caught by a participant by operation of the at least one head unit;

obtaining and recording at least one weight of the at least one fish by operation of the at least one scales;

displaying the at least one image with the at least one weight of the at least one fish;

transmitting the at least one image and the at least one weight of the at least one fish to the at least one external database; and displaying the at least one image with the at least one weight on the mobile app on the at least one personal electronic device.

* * * * *